(12) United States Patent
Alexander

(10) Patent No.: US 12,449,562 B2
(45) Date of Patent: Oct. 21, 2025

(54) DETERMINING A LANDING ZONE IN A SUBTERRANEAN FORMATION

(71) Applicant: Enverus, Inc., Austin, TX (US)

(72) Inventor: Jordan Alexander, Austin, TX (US)

(73) Assignee: Enverus, Inc., Austin, TX (US)

( * ) Notice: Subject to any disclaimer, the term of this patent is extended or adjusted under 35 U.S.C. 154(b) by 1060 days.

(21) Appl. No.: 17/442,449

(22) PCT Filed: Mar. 24, 2020

(86) PCT No.: PCT/US2020/024393
§ 371 (c)(1),
(2) Date: Sep. 23, 2021

(87) PCT Pub. No.: WO2020/198194
PCT Pub. Date: Oct. 1, 2020

(65) Prior Publication Data
US 2022/0155483 A1 May 19, 2022

Related U.S. Application Data

(60) Provisional application No. 62/824,121, filed on Mar. 26, 2019.

(51) Int. Cl.
*G01V 20/00* (2024.01)
*E21B 7/00* (2006.01)
(Continued)

(52) U.S. Cl.
CPC ............... *G01V 20/00* (2024.01); *E21B 7/00* (2013.01); *E21B 41/00* (2013.01); *E21B 49/00* (2013.01);
(Continued)

(58) Field of Classification Search
CPC .......... G01V 20/00; E21B 7/00; E21B 41/00; E21B 49/00; E21B 2200/20;
(Continued)

(56) References Cited

U.S. PATENT DOCUMENTS 8,204,727 B2   6/2012  Dean et al.
8,793,112 B2   7/2014  Levitan
(Continued)

FOREIGN PATENT DOCUMENTS

WO   WO 2016053330   4/2016

OTHER PUBLICATIONS

Ajimoko, "Application of Game Theory for Optimizing Drilling Cost Reduction Programmes" (Year: 2016).*
(Continued)

*Primary Examiner* — Rehana Perveen
*Assistant Examiner* — Troy A Maust
(74) *Attorney, Agent, or Firm* — Fish & Richardson P.C.

(57) ABSTRACT

Techniques for generating a geological model include identifying a plurality of well data for each of a plurality of wells drilled into a reservoir basin from a terranean surface. The reservoir basin includes a plurality of landing zones formed under the terranean surface, each of the landing zone including a discrete geological layer. The techniques further include comparing the plurality of well data for each well with a reservoir basin database that associates the well data with one of the plurality of landing zones; correlating each of the plurality of wells with a particular landing zone of the plurality of landing zones based on the comparison; and generating a geological model of the reservoir basin based on the correlated wells.

30 Claims, 10 Drawing Sheets

(51) Int. Cl.
    *E21B 41/00*     (2006.01)
    *E21B 49/00*     (2006.01)
    *G06F 30/27*     (2020.01)
    *G06N 20/20*     (2019.01)
    *G06N 5/01*     (2023.01)

(52) U.S. Cl.
    CPC ............. *G06F 30/27* (2020.01); *G06N 20/20* (2019.01); *E21B 2200/20* (2020.05); *E21B 2200/22* (2020.05); *G06N 5/01* (2023.01)

(58) Field of Classification Search
    CPC ...... E21B 2200/22; G06F 30/27; G06F 30/20; G06N 20/20; G06N 5/01
    See application file for complete search history.

(56) References Cited

U.S. PATENT DOCUMENTS

| | | | |
|---|---|---|---|
| 10,345,764 | B2 | 7/2019 | Early et al. |
| 11,579,334 | B2 | 2/2023 | Thoms et al. |
| 2012/0191354 | A1 | 7/2012 | Caycedo |
| 2013/0073268 | A1 | 3/2013 | Abacioglu et al. |
| 2014/0156194 | A1 | 6/2014 | Lupin et al. |
| 2015/0134255 | A1* | 5/2015 | Zhang ................... G01V 1/40 702/14 |
| 2015/0233214 | A1 | 8/2015 | Dusterhoft et al. |
| 2016/0186496 | A1 | 6/2016 | De Bakker et al. |
| 2016/0253767 | A1 | 9/2016 | Langenwalter et al. |
| 2017/0364795 | A1* | 12/2017 | Anderson ............. G06N 20/10 |
| 2018/0114158 | A1* | 4/2018 | Foubert ................ E21B 44/00 |
| 2018/0334902 | A1 | 11/2018 | Olsen et al. |
| 2018/0335538 | A1 | 11/2018 | Dupont et al. |
| 2020/0024938 | A1 | 1/2020 | Fry |
| 2020/0149386 | A1 | 5/2020 | Menard |
| 2020/0309992 | A1 | 10/2020 | Alexander |
| 2022/0326409 | A1 | 10/2022 | Thoms |

OTHER PUBLICATIONS

Ajinnoko, O. O. "Application of Game Theory for Optimizing Drilling Cost Reduction Programmes." Offshore Technology Conference Asia. OnePetro, 2016. pp. 1-8. (Year: 2016).

International Preliminary Report on Patentability in International Application No. PCT/US2020/024393, dated Oct. 7, 2021, 8 pages.

PCT International Search Report and Written Opinion in International Application No. PCT/US2020/024393, dated Jul. 7, 2020, 11 pages.

PCT International Search Report and Written Opinion in International Application No. PCT/US2022/023790, dated Jul. 18, 2022, 8 pages.

International Preliminary Report on Patentability in International Appln. No. PCT/US2022/023790, mailed on Oct. 19, 2023, 5 pages.

\* cited by examiner

DETERMINING A LANDING ZONE IN A SUBTERRANEAN FORMATION

CROSS-REFERENCE TO RELATED APPLICATIONS

This application is a National Stage Application under 35 U.S.C. § 371 and claims the benefit of International Application No. PCT/US2020/024393, filed on Mar. 24, 2020, which claims priority to U.S. Provisional Patent Application Ser. No. 62/824,121, filed on Mar. 26, 2019, the entire contents of which is incorporated herein by reference.

TECHNICAL BACKGROUND

This disclosure relates to computing systems, computer-implemented methods, and computer-readable media for determining one or more landing zones in a subterranean formation.

BACKGROUND

Exploring and producing hydrocarbons, such as oil and gas, often include drilling one or more directional wellbores (also known as wells) from a surface, through, and into one or more subterranean layers. In some aspects, each subterranean layer includes a particular geological layer, e.g., distinguished by other geological layers by type of rock or other criteria. In some cases, a directional wellbore, which includes a vertical portion, a curved portion, and a horizontal portion, is formed such that all or most of the horizontal portion is formed in a particular geological layer.

SUMMARY

In an example implementation, a computer-implemented method for generating a geological model includes identifying, with one or more hardware processors, a plurality of well data for each of a plurality of wells drilled into a reservoir basin from a terranean surface. The reservoir basin includes a plurality of landing zones formed under the terranean surface, each of the landing zone including a discrete geological layer. The method further includes comparing, with the one or more hardware processors, the plurality of well data for each well with a reservoir basin database that associates the well data with one of the plurality of landing zones; correlating, with the one or more hardware processors, each of the plurality of wells with a particular landing zone of the plurality of landing zones based on the comparison; and generating, with the one or more hardware processors, a geological model of the reservoir basin based on the correlated wells.

In an aspect combinable with the example implementation, the plurality of well data includes surface latitude (Y), surface longitude (X), and true vertical depth (TVD).

In another aspect combinable with any of the previous aspects, the plurality of well data further include a distance-to-horizon value between the TVD and at least one of the discrete geological layers.

Another aspect combinable with any of the previous aspects further includes determining, with the one or more hardware processors, the distance-to-horizon value between each of the discrete geological layers and the TVD.

In another aspect combinable with any of the previous aspects, the plurality of well data excludes complete directional surveys.

In another aspect combinable with any of the previous aspects, the steps of comparing and correlating include executing a machine learning process.

In another aspect combinable with any of the previous aspects, the machine learning process includes a tree-based machine learning process.

Another aspect combinable with any of the previous aspects further includes validating, with the one or more hardware processors, the generated geological model.

In another aspect combinable with any of the previous aspects, validating the generated geological model includes determining, with the one or more hardware processors, a number of mis-correlations of the plurality of wells with the particular landing zone of the plurality of landing zones; and determining, with the one or more hardware processors, that the number of mis-correlations are less than a threshold number.

In another aspect combinable with any of the previous aspects, validating the generated geological model includes determining, with the one or more hardware processors, Shapley values for each of the plurality of well data; determining, with the one or more hardware processors, a greatest of the determined Shapley values; and determining, with the one or more hardware processors, the particular well data that corresponds to the greatest Shapley value.

Another aspect combinable with any of the previous aspects further includes identifying, at a server computing system that stores the generated geological model, a request from a client computing system that includes an identification of one or more drilled wells in the reservoir basin; determining, with the server computing system and based on the generated geological model, a particular landing zone for each of the identified one or more drilled wells; and preparing, with the server computing system, a graphic that describes the determined particular landing zones for display at the client computing system.

Another aspect combinable with any of the previous aspects further includes identifying, at a server computing system that stores the generated geological model, a request from a client computing system that includes an identification of the reservoir basin; determining, with the server computing system and based on the generated geological model, a plurality of wells drilled in the identified reservoir basin and a particular landing zone for each of the plurality of wells; and preparing, with the server computing system, a graphic that describes the determined plurality of wells drilled in the identified reservoir basin and the particular landing zone for each of the plurality of wells at the client computing system.

Another aspect combinable with any of the previous aspects further includes identifying, at a server computing system that stores the generated geological model, a request from a client computing system that includes an identification of a plurality of well data for a drilled well in the reservoir basin; determining, with the server computing system and based on the generated geological model, a landing zone for the drilled well; and preparing, with the server computing system, a graphic that describes the determined landing zone for the drilled well for display at the client computing system.

In another example implementation, a computing system includes one or more memory modules that stores or references a plurality of well data; and one or more hardware processors configured to execute instructions stored on the one or more memory modules to perform operations. The operations include identifying the plurality of well data for each of a plurality of wells drilled into a reservoir basin from a terranean surface. The reservoir basin includes a plurality of landing zones formed under the terranean surface, where each of the landing zone includes a discrete geological layer. The operations further include comparing the plurality of well data for each well with a reservoir basin database that associates the well data with one of the plurality of landing zones; correlating each of the plurality of wells with a particular landing zone of the plurality of landing zones based on the comparison; and generating a geological model of the reservoir basin based on the correlated wells.

In an aspect combinable with the example implementation, the plurality of well data includes surface latitude (Y), surface longitude (X), and true vertical depth (TVD).

In another aspect combinable with any of the previous aspects, the plurality of well data further include a distance-to-horizon value between the TVD and at least one of the discrete geological layers.

In another aspect combinable with any of the previous aspects, the operations further include determining the distance-to-horizon value between each of the discrete geological layers and the TVD.

In another aspect combinable with any of the previous aspects, the plurality of well data excludes complete directional surveys.

In another aspect combinable with any of the previous aspects, the operations of comparing and correlating include executing a machine learning process.

In another aspect combinable with any of the previous aspects, the machine learning process includes a tree-based machine learning process.

In another aspect combinable with any of the previous aspects, the operations further include validating the generated geological model.

In another aspect combinable with any of the previous aspects, validating the generated geological model includes determining, with the one or more hardware processors, a number of mis-correlations of the plurality of wells with the particular landing zone of the plurality of landing zones; and determining, with the one or more hardware processors, that the number of mis-correlations are less than a threshold number.

In another aspect combinable with any of the previous aspects, validating the generated geological model includes determining, with the one or more hardware processors, Shapley values for each of the plurality of well data; determining, with the one or more hardware processors, a greatest of the determined Shapley values; and determining, with the one or more hardware processors, the particular well data that corresponds to the greatest Shapley value.

In another aspect combinable with any of the previous aspects, the operations further include identifying or receiving a request from a client computing system that includes an identification of one or more drilled wells in the reservoir basin; determining a particular landing zone for each of the identified one or more drilled wells based on the generated geological model; and preparing a graphic that describes the determined particular landing zone for display at the client computing system.

In another aspect combinable with any of the previous aspects, the operations further include identifying a request from a client computing system that includes an identification of the reservoir basin; determining a plurality of wells drilled in the identified reservoir basin and a particular landing zone for each of the plurality of wells based on the generated geological model; and preparing a graphic that describes the determined plurality of wells drilled in the identified reservoir basin and the particular landing zone for each of the plurality of wells at the client computing system.

In another aspect combinable with any of the previous aspects, the operations further include identifying a request from a client computing system that includes an identification of a plurality of well data for a drilled well in the reservoir basin; determining a landing zone for the drilled well based on the generated geological model; and preparing a graphic that describes the determined landing zone for the drilled well for display at the client computing system.

In another example implementation, a computer-implemented method for determining one or more landing zones for a well includes identifying or receiving, with one or more hardware processors, a request that includes data associated with one or more drilled wells in a reservoir basin; and based on the request, determining, with the one or more hardware processors, a particular landing zone of a plurality of landing zones for each of the identified one or more drilled wells from a geological model of the reservoir basin. The geological model includes correlated well data of a plurality of well data of one or more wells formed in the reservoir basin into the plurality of landing zones that include the reservoir basin, where each of the landing zones includes a discrete geological layer. The method further includes preparing, with the one or more hardware processors, a graphic that describes the determined particular landing zone for display at a graphical user interface (GUI).

In an aspect combinable with the example implementation, the plurality of well data includes at least one of: surface latitude (Y) of the one or more wells, surface longitude (X) of the one or more wells, true vertical depth (TVD) of the one or more wells, or a distance-to-horizon value between the TVD of the one or more wells and at least one of the discrete geological layers.

In another aspect combinable with any of the previous aspects, the data associated with the one or more drilled wells includes at least one of: an identification of the one or more drilled wells; an identification of the reservoir basin; or an identification of a plurality of well data for the one or more drilled wells.

In another example implementation, a computing system includes one or more memory modules that stores or references a geological model of a reservoir basin; and one or more hardware processors configured to execute instructions stored on the one or more memory modules to perform operations. The operations include identifying or receiving a request that includes data associated with one or more drilled wells in the reservoir basin; based on the request, determining a particular landing zone of a plurality of landing zones for each of the identified one or more drilled wells based on the geological model of the reservoir basin, where the geological model includes correlated well data of a plurality of well data of one or more wells formed in the reservoir basin into the plurality of landing zones that include the reservoir basin, and each of the landing zones including a discrete geological layer; and preparing a graphic that describes the determined particular landing zone for display at a graphical user interface (GUI).

In an aspect combinable with the example implementation, the plurality of well data includes at least one of: surface latitude (Y) of the one or more wells, surface longitude (X) of the one or more wells, true vertical depth (TVD) of the one or more wells, or a distance-to-horizon value between the TVD of the one or more wells and at least one of the discrete geological layers.

In another aspect combinable with any of the previous aspects, the data associated with the one or more drilled wells includes at least one of: an identification of the one or more drilled wells; an identification of the reservoir basin; or an identification of a plurality of well data for the one or more drilled wells.

One, some, or all of the implementations according to the present disclosure may include one or more of the following features. For example, systems and method according to the present disclosure may provide for more accurate hydrocarbon production and leasing information by providing for accurate landing zones of one or more wells within a reservoir basin. As another example, systems and method according to the present disclosure may provide more accurate determinations of well landing zones in closely stacked geologic formations by providing an accurate landing zone determination in a specific one of the stacked layers. As yet another example, systems and method according to the present disclosure may provide for more accurate information and/or recommendations on land acreage lease value and investment ROI by providing for more accurate well landing zone information.

The details of one or more embodiments are set forth in the accompanying drawings and the description below. Other features, objects, and advantages will be apparent from the description and drawings, and from the claims.

DETAILED DESCRIPTION

Figure 1:
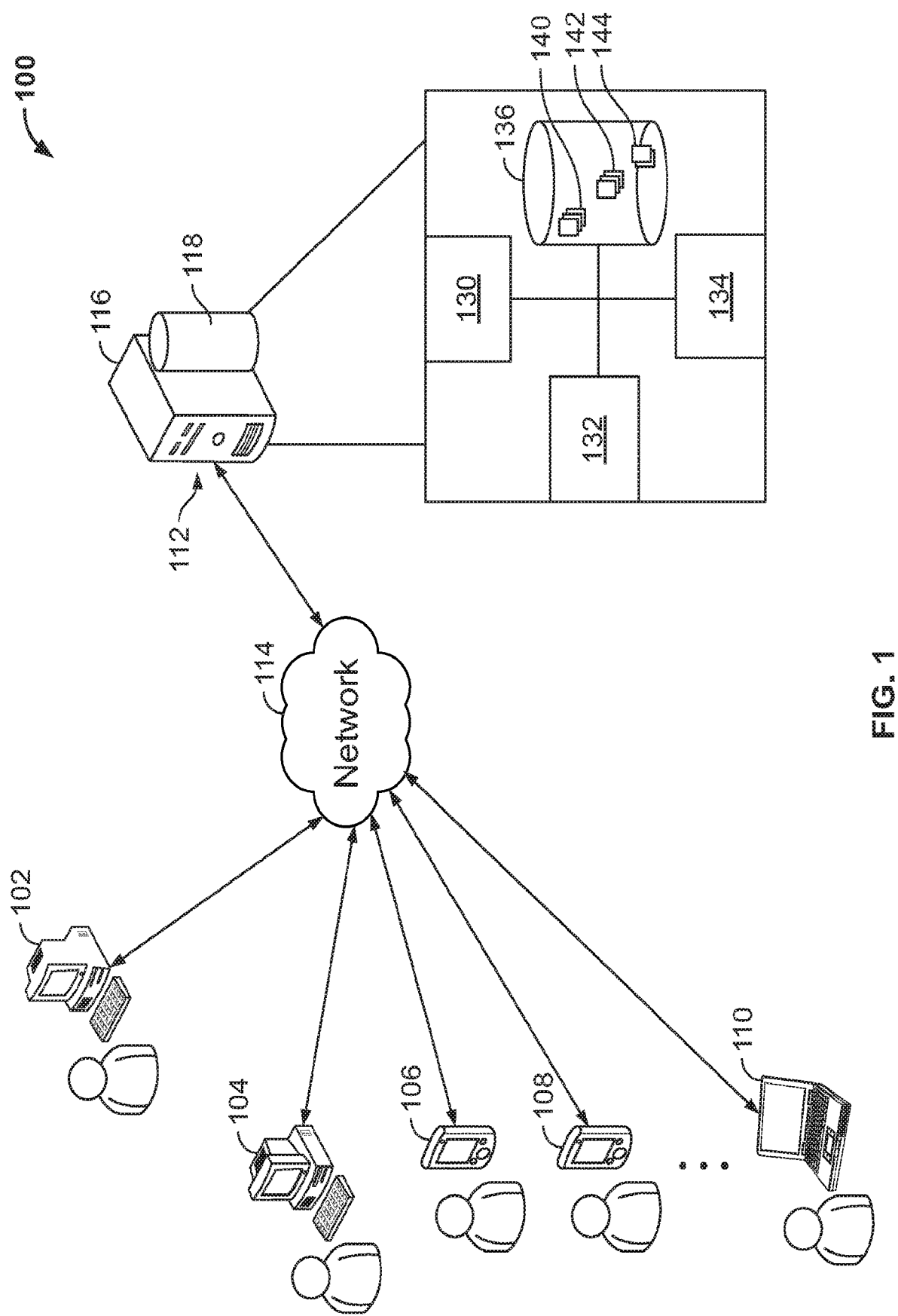
FIG. 1 illustrates an example distributed network architecture that includes one or more client devices and one or more server devices for determining one or more wellbore landing zones according to the present disclosure.

This disclosure describes implementations of computer-implemented methods and systems for generating a geologic model of a reservoir basin and determining a landing zone (e.g., a particular geologic formation layer among many geologic formation layers under a terranean surface) of a wellbore formed from the terranean surface and into the particular basin based on the model. In some aspects, the described implementations may utilize wellbore criteria, such as true vertical depth (TVD) and completion data (such as directional survey information). In some aspects, the described implementations may utilize machine learning techniques to determine the landing zone. By determining the landing zone of a wellbore, more accurate production and leasing information may be determined. For example, in geographic areas with many (e.g., ten, twenty, thirty, or more) closely stacked geologic formation layers under the terranean surface, an accurate determination of which specific geologic formation layer that a directional wellbore lands in (e.g., horizontal portion of the wellbore is formed in) may provide more accurate production prediction information. Such production prediction information can also affect other wellbore formation data, such as land acreage lease value and investment return data.

In some aspects, a machine learning methodology predicts landing zones based on existing patterns in landing zone distribution along with completion data. In some aspects, the completion data includes directional surveys that show depth and location of the directional wellbore along a complete length of the wellbore. In some aspects, such directional surveys are missing or incomplete. Other data, such as TVD data as well as longitude and latitude data, may be complete or available more quickly as compared to directional surveys.

Part of a geological model of a reservoir basin may be generated based on known, complete or mostly complete, wellbore trajectories that land in particular, known, geological layers of the basin. For example, part of a geological model according to the present disclosure may include a geologic framework that includes reservoir basin-wide maps based on digitized well logs and formation picks. Such a framework (also called a reservoir basin database) may include, e.g., hundreds of thousands of horizon tops operator-correlated across over tens of thousands of wells (e.g., by geologists or other operators). Building on this framework, structural modeling techniques may be used to create a self-consistent, three-dimensional representation of the reservoir basin (or basins). Stratigraphic pinch-outs, unconformities, and faults may all be represented in the framework model. In some aspects, this portion of the geological model includes operator selected digital trajectories. Once the framework is completed, known wellbore trajectories (e.g., full or mostly complete trajectories) are automatically placed within the framework model using each well's digital trajectory. Once placed, the landing zone of each particular well, as well as other attributes such as footage within zone, percent in zone, toe up/down, average azimuth, distance from top and bottom of zone, may be determined and placed in the framework.

As more fully explained herein, a full geological model for a reservoir basin may also include a derived portion built onto the framework by one or more machine learning processes. For example, known wells with incomplete trajectories, or even only a few location points (e.g., entry longitude and latitude, TVD) may be included within the geological model. For example, the framework generated with known wellbore trajectories and landing zones may be supplemented with location data (e.g., latitudes and longitudes), depth data (TVD/TD from completion reports), maps (horizon depth data by location), and other pertinent information. The machine learning process may be trained on the framework to then derive landing zones for wells with incomplete (or even complete) wellbore trajectories available.

FIG. 1 illustrates an example distributed network architecture 100 that includes one or more client devices and one or more server devices that is operable to generate a geologic model of a reservoir basin and determine a landing zone of one or more wellbores of a wellbore system. In some aspects, the example distributed network architecture 100 is also operable to generate the geological model based on one or more machine learning processes and, in some aspects, validating the geological model.

Figure 2A:
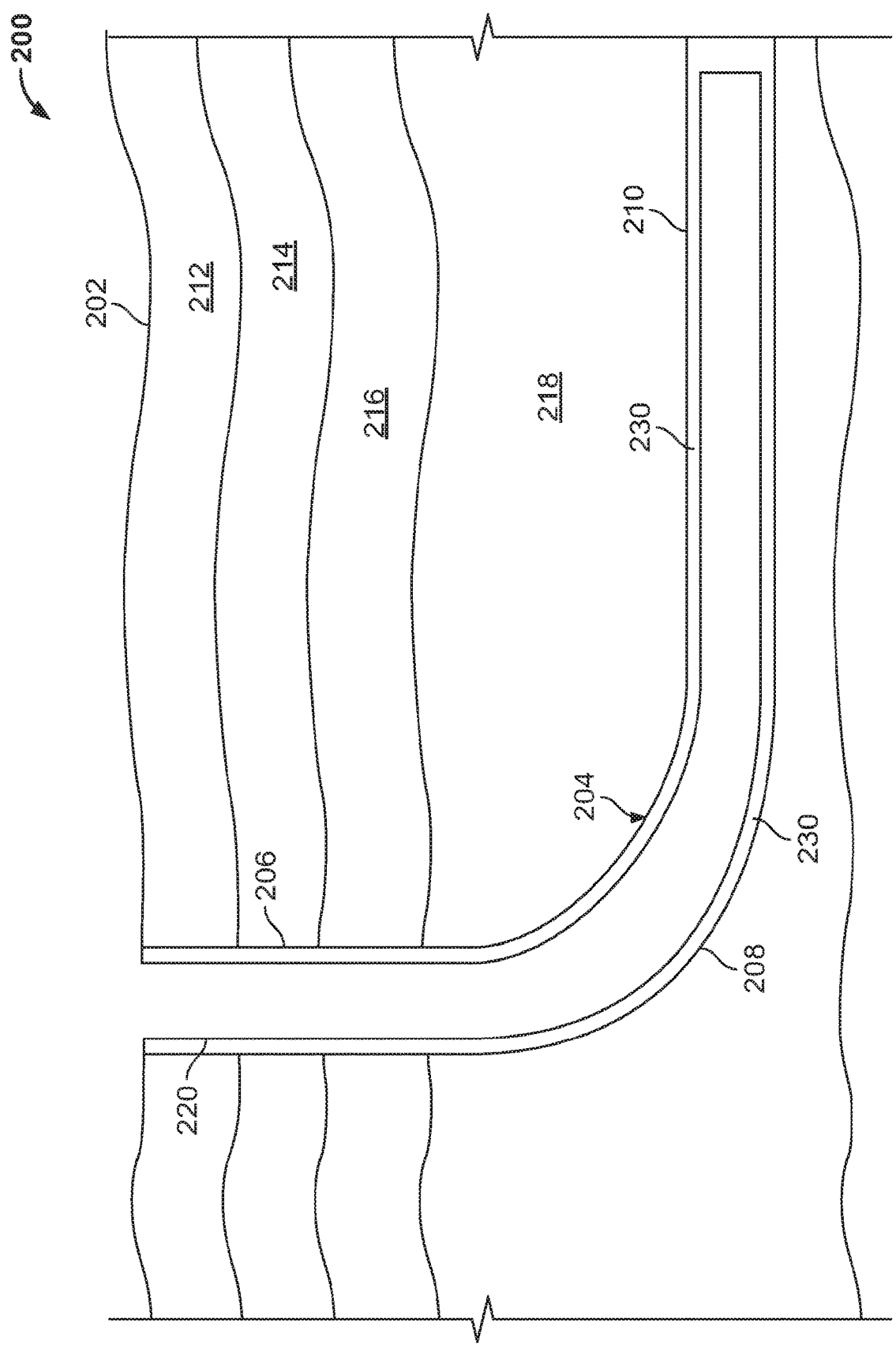
FIG. 2A illustrates an example wellbore system in which a directional wellbore is formed through and into one or more landing zones according to the present disclosure.

Turning briefly to FIG. 2A, an example wellbore system 200 is shown. The wellbore system 200 may represent, e.g., one or more wells from which well data is obtained with or by the distributed network architecture 100 in order to generate a geologic model of a reservoir basin and determine a landing zone of one or more wellbores of the wellbore system 200. The example wellbore system 200 includes one or more wells 204. The example well 204 includes a vertical portion 206 that is coupled to a curved portion 208 that is coupled to a horizontal portion 210. In this example, the well 204 includes a casing 220 positioned in at least a part of the well 204 and secured with cement 230. As shown, the well 204 is formed from a terranean surface 202 through multiple geological layers (e.g., landing zones) labeled as layers 212, 214, 216, and 218. Such layers are only exemplary and a wellbore system according to the present disclosure may include more or fewer geological layers. In some aspects, each geological layer 212 through 218 is distinct from other, including adjacent, layers due to, e.g., one or more geological properties. In some aspects, the one or more geological properties include rock type. Thus, in some aspects, adjacent geological layers shown in FIG. 2A may be formed of different rock types (e.g., shale vs. sandstone). In other aspects, adjacent geological layers shown in FIG. 2A may be formed of the same rock type (e.g., shale) but have different geological properties otherwise.

Returning to FIG. 1, the network architecture 100 includes a number of client devices 102, 104, 106, 108, 110 communicably connected to a structured data processing server system 112 ("server system 112") by a network 114. The server system 112 includes a server device 116 and a data store 118. The server device 116 executes computer instructions (e.g., all or a part of a well landing zone solver application) stored in the data store 118 to perform functions of a well landing zone service. For example, in some aspects, the well landing zone service may be a subscription service available to the client devices 102, 104, 106, 108, and 110 (and other client devices) by an owner or operator of the server system 112. In some aspects, the server system 112 may be owned or operated by a third party (e.g., a collocation server system) that hosts the well landing zone service for the owner or operator of the well landing zone service.

Users of the client devices 102, 104, 106, 108, 110 access the server device 112 to participate in the well landing zone service. For example, the client devices 102, 104, 106, 108, 110 can execute web browser applications that can be used to access the well landing zone service. In another example, the client devices 102, 104, 106, 108, 110 can execute software applications that are specific to the well landing zone service (e.g., as "apps" running on smartphones). In other words, all of the well landing zone service may be hosted and executed on the server system 112. Or in alternative aspects, a portion of the well landing zone service may execute on the client devices 102, 104, 106, 108, and 110 (e.g., to receive and transmit information entered by a user of such client devices and/or to display output data from the well landing zone service to the user).

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

As illustrated in FIG. 1, the server system 112 (e.g., the server device 116 and data store 118) includes one or more processing devices 132, the well landing zone solver 130, one or more memory modules 136, and an interface 134. Generally, each of the components of the server system 112 are communicably coupled such that the one or more processing devices 132 may execute the well landing zone solver 132 and access and manipulate data stored in the one or more memory modules 136. Data to be output from the server system 112, or data to be input to the server system 112, may be facilitated with the interface 134 that communicably couples the server system 112 to the network 114.

As illustrated in this example, the one or more memory modules 136 may store or reference one or more well data sets 140. Each of the well data sets 140 may comprise data or information that is generally available to the public (e.g., through online or other resources) or data that is not generally available to the public (e.g., but known or obtained through business or other relationships). In some aspects, the well data sets 140 include one or more of surface latitude of one or more wells, surface longitude of one or more wells, or true vertical depth (TVD) of one or more wells. In some aspects, the well data sets 140 include all three of surface latitude, surface longitude, and TVD of one or more wells.

Other data that may be included in the well data sets 140 are distances-to-horizon values. For example, distance-to-horizon values include a distance between a TVD of a well and a particular geological layer (e.g., landing zone).

As another example, well data sets 140 may include directional surveys associated with one or more wells. For example, each well may include a directional survey that provides measurement (in whole or part for the well) of the inclination and azimuth of a location in the well. In some aspects, the location is the total depth of the well at the time of measurement. The measurements include inclination from vertical, and the azimuth (or compass heading) of the wellbore. These measurements that make up the directional survey are made at discrete points in the well, and the approximate path of the wellbore computed from the discrete points. In some aspects, the well data sets 140 include complete directional surveys for one or more wells. In some aspects, the well data sets 140 include incomplete directional surveys for one or more wells.

In some examples, well data sets 140 may include other well drilling, completion, or production data (or a combination thereof). For example, in some aspects, the well drilling, completion, or production data may be obtained from a public source such as a regulatory agency (e.g., a state railroad commission) or other political agency. As another example, the well data sets 140 may also include other well trajectory data. As with the drilling, completion, or production data, well trajectory data may be obtained publicly through, e.g., a regulatory agency (e.g., a state railroad commission) or other political agency. As another example, the well data sets 140 may also include well permit (e.g., drilling) data (e.g., reported by a regulatory agency or otherwise). As another example, the well data sets 140 may also include hydraulic fracturing data (e.g., reported by a regulatory agency or otherwise).

In some aspects, data in a particular well data set 140 may be simply raw data, i.e., data that has not been manipulated, synthesized, aggregated (except over time), or otherwise interpreted. In alternative aspects, some data in the particular well data set 140 may be interpreted data, i.e., raw data that has been manipulated, synthesized, aggregated, or otherwise changed to derive the interpreted data.

As shown, the one or more memory modules 136 may store other portions of data that are determined or produced during execution of the well landing zone solver 130. For example, the well landing zone solver 130 may generate one or more geological models 142 that, once generated, are stored (at least transiently) in the memory modules 136. The memory modules may further store one or more reservoir basin databases 144, e.g., one for each of many particular, unique reservoir basins.

Figure 2B:
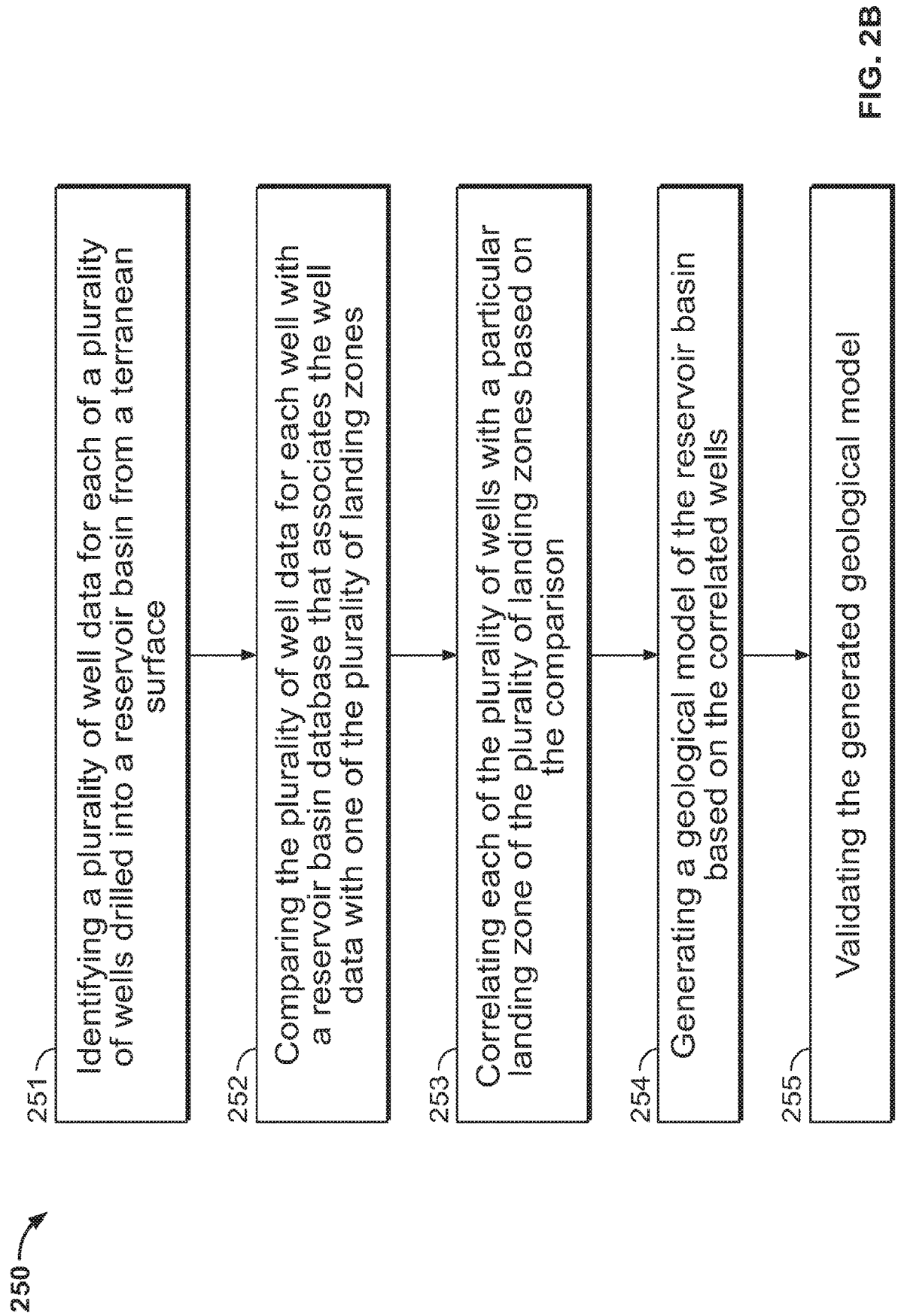
FIG. 2B-2C illustrate example processes according to the present disclosure.

Turning now to FIG. 2B, this figure illustrates an example process 250 for generating a geological model of a reservoir basin with one or more landing zones according to the present disclosure. In some aspects, process 250 may be executed with or by the well landing zone solver 130 as part of the distributed network architecture 100. Process 250 may begin at step 251, which includes identifying a plurality of well data for each of a plurality of wells drilled into a reservoir basin from a terranean surface. For example, the well data includes data associated with the wellbore, such as TVD, longitude (X), and latitude (Y) data. Such data contains location, depth and geologic context for the wellbore. Each of these parameters may be a predictor of the landing zone of the wellbore, however, this data may not fully capture some complexities present in landing zones that are thinner and less geographically consistent.

Process 250 may continue at step 252, which includes comparing the plurality of well data for each well with a reservoir basin database that associates the well data with one of the plurality of landing zones. For example, in some aspects, the known X, Y, and TVD values (e.g., that, together, define a location in three dimensions, or 3D location, under the terranean surface) provide an initial set of features for comparison in order to generate (e.g., train) the landing zone geological model. In some aspects, the training can be enhanced by additional information, such as distance of the 3D locations relative to horizons in the reservoir basin (i.e., interfaces between the geological layers). Each horizon's depth, or "Z" value, therefore, may be used in conjunction with the X, Y, and TVD values to train the landing zone geological model. In some aspects, Z values may be obtained by extracting such data from an interpreted map to an API based on its X and Y data. Once each horizon's depth, or Z, is known, a distance to horizon may be calculated as Z minus TVD (at a particular X and Y). By training the geological model based on known X, Y, TVD, and distance to horizon values in a known reservoir basin, the model can then be used to determine, in part, a particular landing zone based on input wellbore data in that basin.

Figure 3:
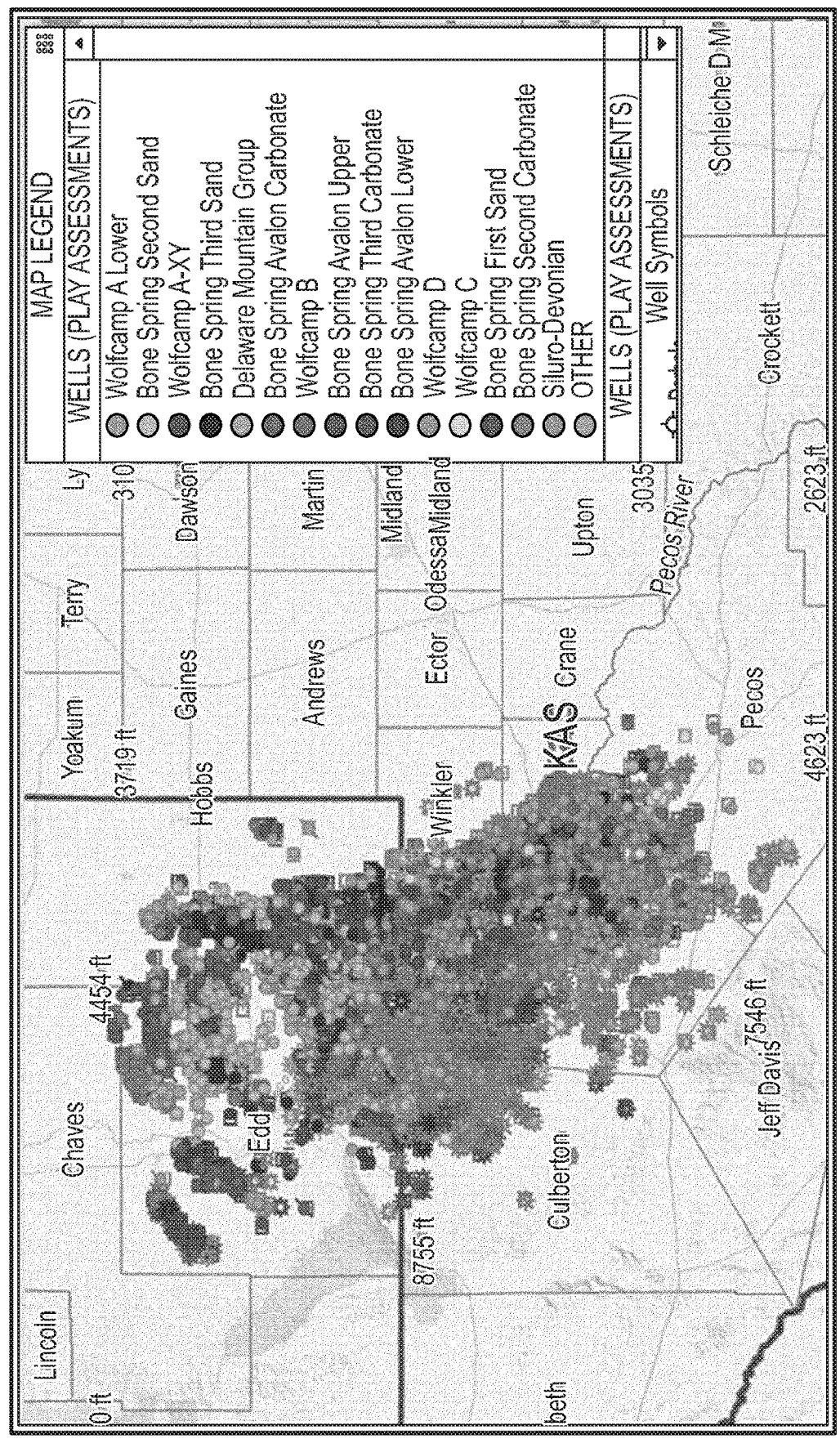
FIG. 3 illustrates a graphic of Delaware Basin directional wells shaded by landing zone.

Process 250 may continue at step 253, which includes correlating each of the plurality of wells with a particular landing zone of the plurality of landing zones based on the comparison. For example, the known well data (e.g., latitude, or longitude, or TVD, or a combination thereof) is correlated to known geologic layers within the reservoir basin. The reservoir basin includes multiple landing zones (e.g., multiple geologic formation layers stacked beneath the terranean surface). An example is the Delaware Basin shown in FIG. 3. FIG. 3 includes a graph 300 and a map legend that lists (and color codes) the particular landing zones in this basin, including, Wolfcamp A Lower, Bone Spring Second Sand, and others (22 in all). The Delaware Basin comprises a proven stacked pay that complicates the geographic clustering of viable target reservoirs. FIG. 3 also includes color coded circles that represent previously known and drilled wellbores in which the landing zone of each wellbore is known (and color coded according to the map legend). The geological model of the Delaware basin, therefore, correlates each known wellbore to its respective landing zone. As shown in FIG. 3, in the Delaware Basin, the three stratigraphic intervals with the most landing zones are Wolfcamp A Lower, Bone Spring Second Sand, and Wolfcamp A-XY, combining for 51.3% of the total landing zone counts. Due to the concentration of landing zones in the Wolfcamp A, the Wolfcamp A Lower was a natural horizon to extract a distance to each well's TVD (i.e., the Z values) to build the geologic model. In some aspects, data reported to a regulatory agency (e.g., an agency responsible for hydrocarbon production reporting in a given state) may be even less granular than that shown in FIG. 3 (i.e., less landing zones reported).

In some aspects, steps 252 and 253 are part of a machine-learning process that generates the geologic model based on the well data for the reservoir basin. For example, in some aspects, the particular machine learning geological model is limited to a single basin to address geographical constraints. Due to the inherent nature of training geological models on landing zones created by subsurface mapping, the described methods may be implemented according to a previously mapped structural model bounds. This provides assurance that the model is learning geology in an area that has already been interpreted by proscribed geological constraints.

Figure 4:
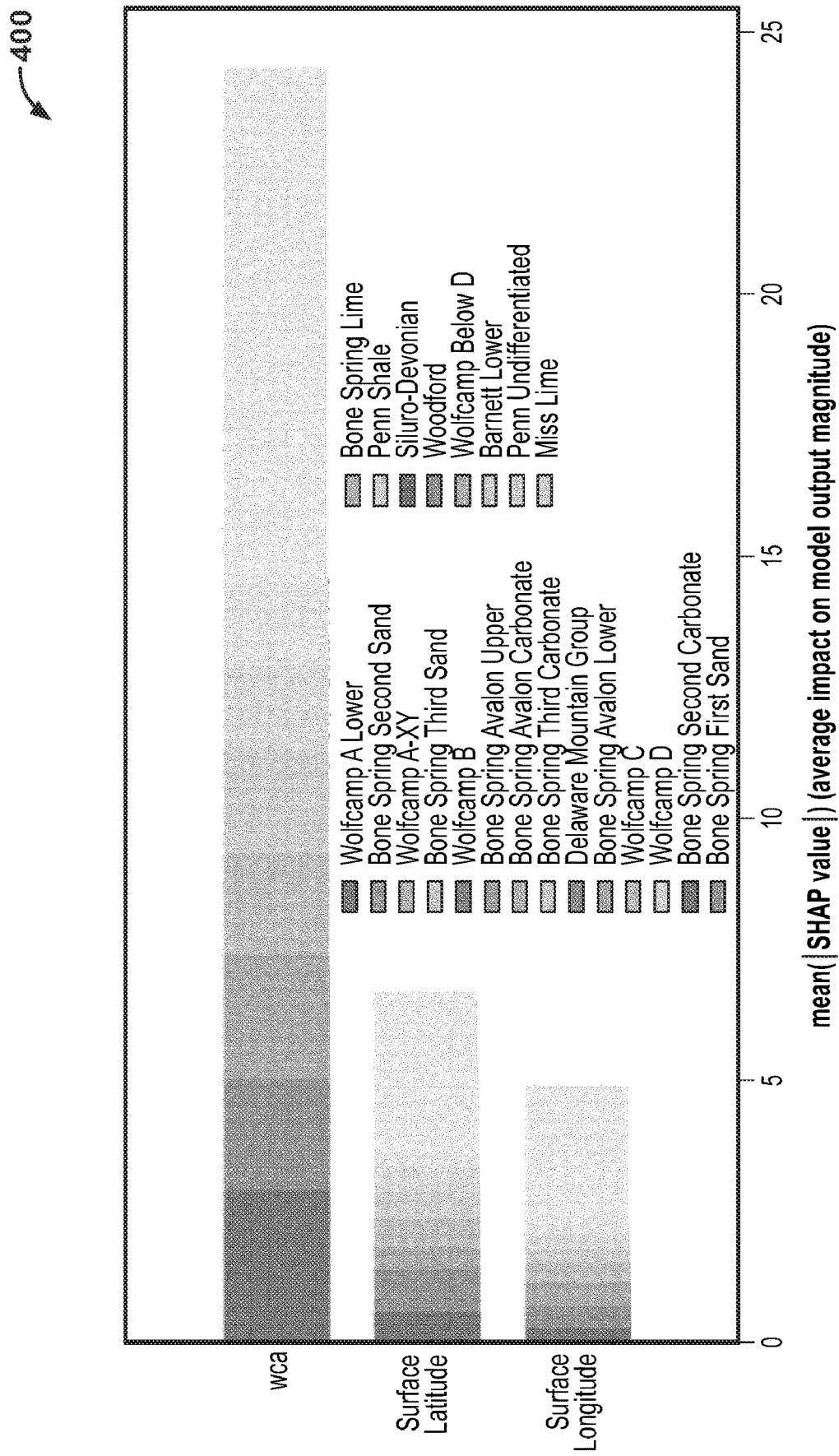
FIG. 4 illustrates a feature importance plot showing example features used for prediction for a geological model.

In some aspects, Shapley values can be calculated for each predictor to show the model's dependence on certain features by class. FIG. 4 illustrates a graph 400 that is a feature importance plot showing example features used for prediction for a geological model. Graph 400, for example, shows the influence that 'distance to horizon' variable has in a model. FIG. 4 also highlights that this machine learning model is anchoring its decisions on this key geologic information. As shown in FIG. 4, "wca" stands for "distance to Wolfcamp A Lower," i.e., the difference between Z value and the TVD at the "SurfaceLatitude" and "SurfaceLongitude" (shown in this graph) and the horizon that corresponds to the Wolfcamp A lower geological layer. As shown in FIG. 4, the dependence on the "wca" is greater than the dependence on both "SurfaceLatitude" and "SurfaceLongitude."

In training the geological model, many different machine learning modeling techniques could be used. In some aspects, a tree-based learners, such as Random Forests, may provide more accurate machine learned models. In some aspects, a gradient boosting framework can be used to enhance tree-based learning algorithms. In a geological model trained for the Delaware Basin, the model trained on data from 5877 wells, and was compared to a test set of 1470 samples to cross-validate against the known landing zones and calculate accuracy. The average accuracy in the Delaware basin is 80.5%, with Wolfcamp A Lower and Bone Spring Second Sand showing the best results of zones with high sample size, at 86% and 94% respectively.

Process 250 may continue at step 254, which includes generating a geological model of the reservoir basin based on the correlated wells. Once correlation has completed, the geological model may allow for one or more inputs (e.g., associated with one or more wells drilled into the reservoir basin) to be used to generate one or more outputs that include determined landing zones of the one or more drilled wells.

Figure 5:
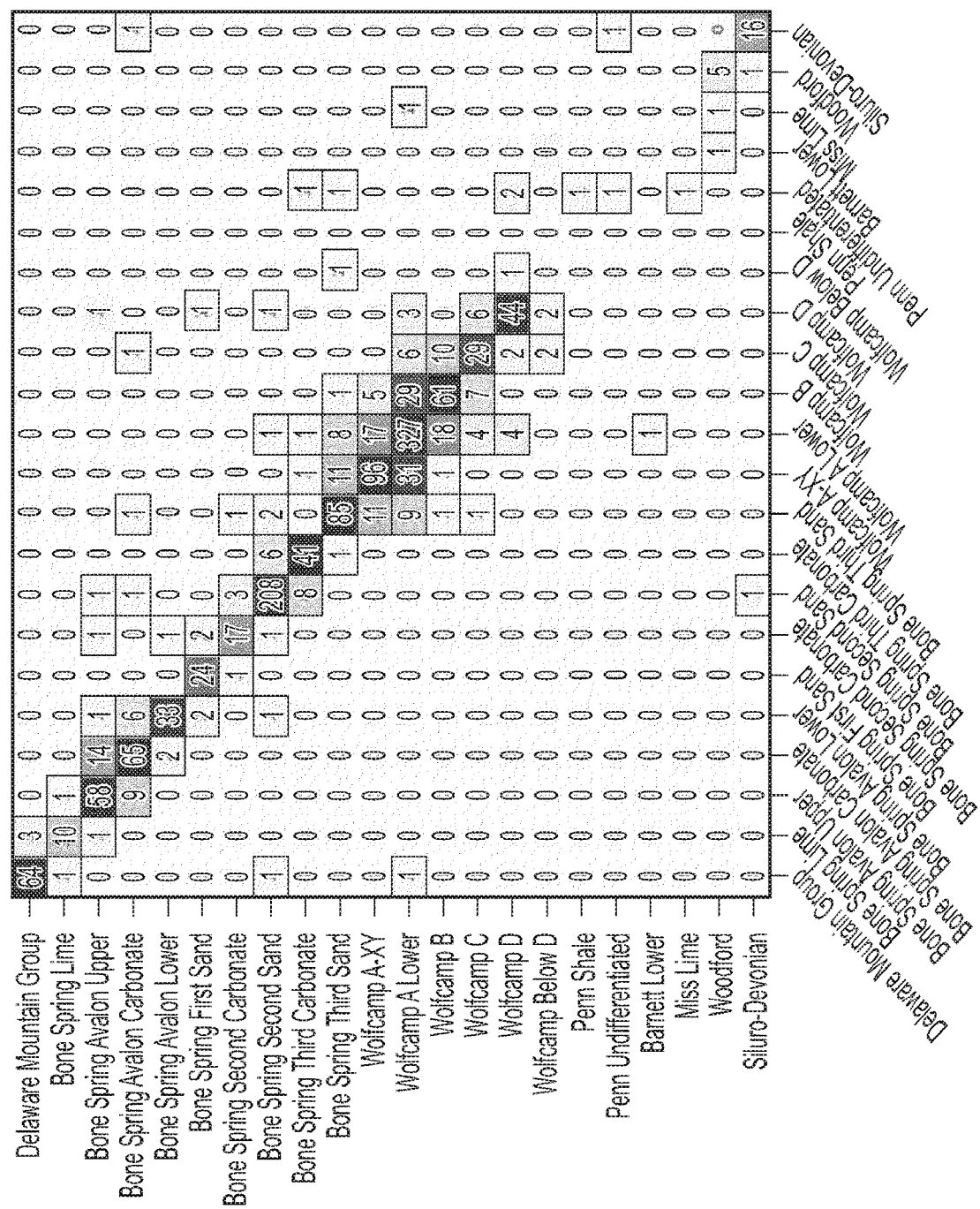
FIG. 5 illustrates a heat map of a geological model confusion matrix, with the landing zones in stratigraphic order. The true value is on the Y-axis and the predicted value is on the X-axis.

Process 250 may continue at step 255, which includes validating the generated geological model. For example, a machine-learning model may be validated by, for example, by determining that a number of mis-correlations of the wells in the reservoir basin relative to the correlated landing zones are less than a threshold number. For example, FIG. 5 shows a graph 500 that shows the distribution of predictions and how the trained geological model for the Delaware Basin is missing when it does misclassify. This graph 500 shows a list of the predicted landing zones in the basin on the left hand y-axis and the correct landing zones on the x-axis. On the right hand y-axis is a scale of number of predictions, with each prediction corresponding to a particular drilled well. This graph 500 also shows that when the generated geologic model misclassifies a landing zone, it almost always predicts a zone that is stratigraphically adjacent (i.e., a geological layer that is directly above or directly below the correct, known landing zone).

Figure 6:
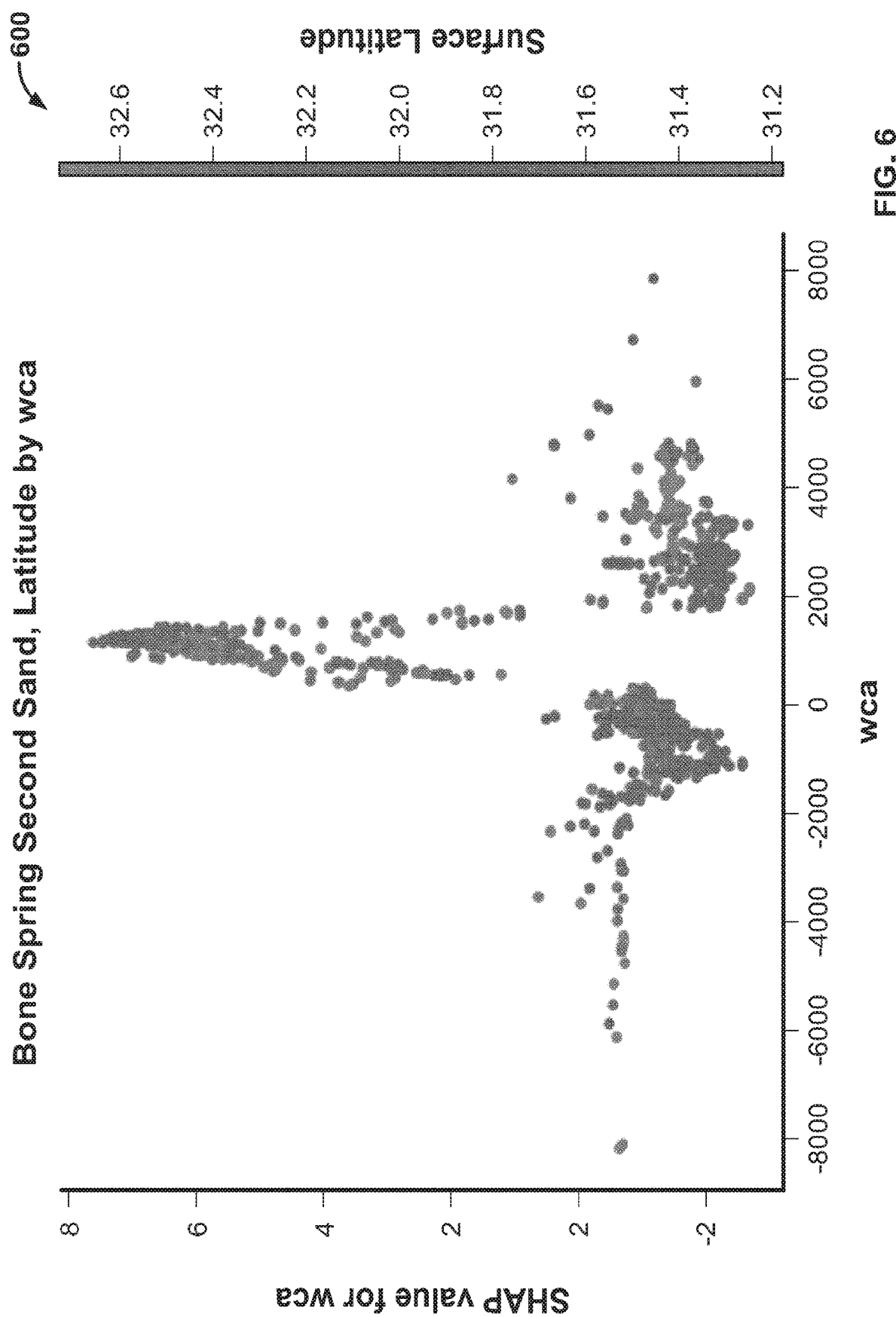
FIG. 6 illustrates a plot showing "distance to Wolfcamp A Lower" values on the X-axis, shaded by latitude values and Shapley values for the Bone Spring Second Sand geological layer plotted on Y-axis.

Step 255 may also include validating the generated geological model based on Shapley values. For example, the geological model can also be better understood with reference to dependence plots of Shapley values. For example, FIG. 6 is a dependence plot 600 where values above zero on the Y-axis indicate that they are raising the likelihood for a well to be given a Bone Spring Second Sand landing zone prediction. The higher the value, the more influence that variable is having on the model's decision for that range of values. Such values may be further confirmation that the model is behaving within the known geology of the areas. The spike of "wca" values ranging from 0-2000 show a good correlation with latitude values (Y) on average greater than 31.6. This plot 600 also indicates that if a well is north of 31.6 degrees latitude and less than 2,000 feet above the Wolfcamp A Lower, it has a high likelihood of being assigned a Bone Spring Second Sand landing zone prediction.

The trained geological model for the Delaware Basin was able to generate 89,756 landing zones, with an average accuracy of 94% across all layers. In any trained model, as additional training data is supplied, accuracy is improved in predicting the correct landing zone for any particular new well drilled into that basin. Importantly, the above-described geological model generation methods do not require a complete well trajectory to assign a landing zone, which provides for an expanded landing zone coverage (e.g., to areas in which no full or complete directional surveys are available).

In another operation according to the present disclosure, a trained geological model for a particular basin may be stored or hosted on a server computing system and a client computing system may be used to access or utilize the geological model. For example, the client computing device may input or provide a well name (e.g., API number or other identifying characteristics) to the server computing device. In response, the server computing device may provide, expose, or transmit a particular landing zone that the trained geological model associates with the input well name to the client computing device. As another example, the client computing device may input or provide a reservoir basin name to the server computing device. In response, the server computing device may provide, expose, or transmit a list of wells and their associated landing zones according to the trained geological model to the client computing device. As another example, the client computing device may input or provide data such as X, Y, and TVD (i.e., a 3D location in a particular basin) to the server computing device. In response, the server computing device may provide, expose, or transmit a particular landing zone according to the trained geological model in which the input 3D location is located to the client computing device.

Figure 2C:
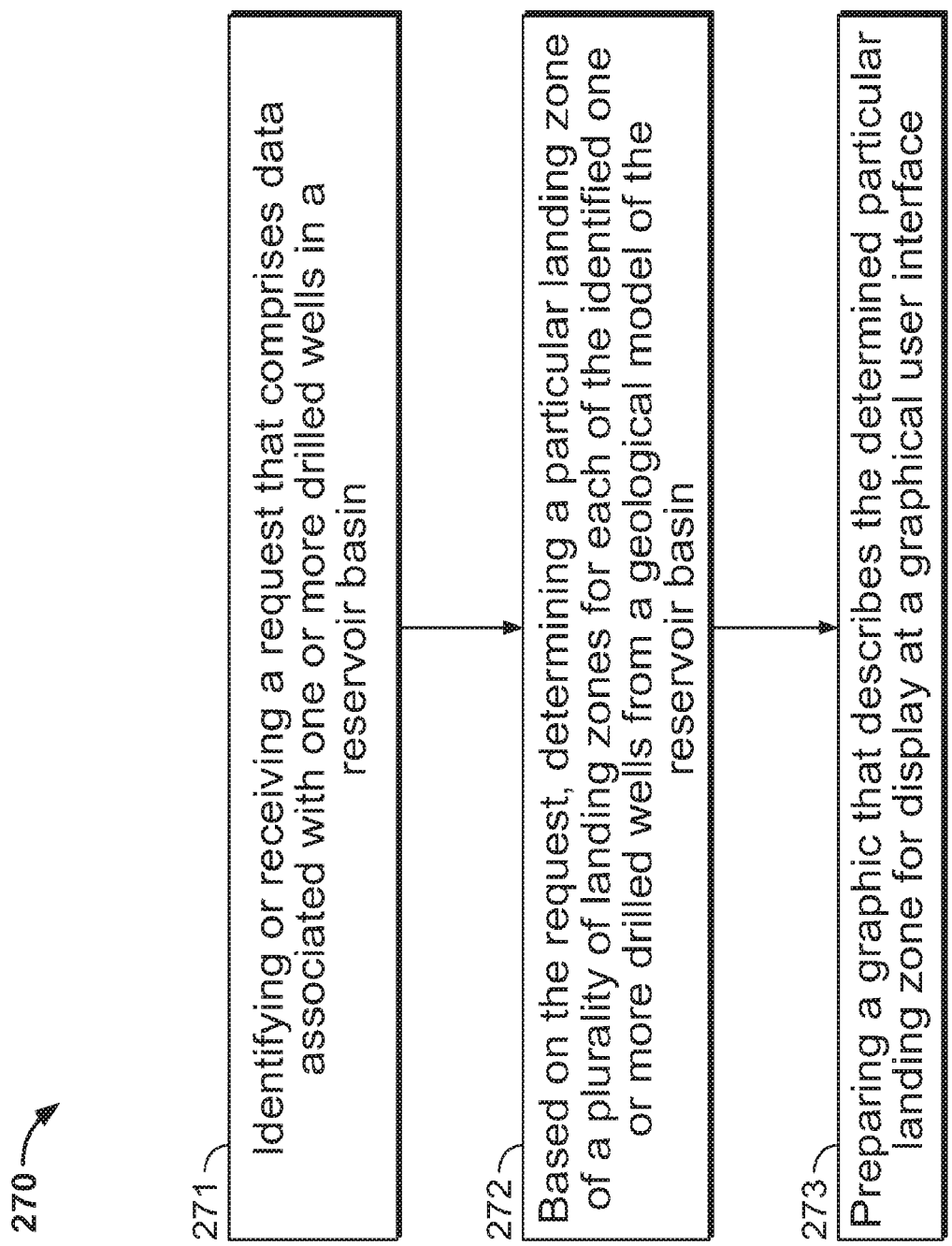

For example, FIG. 2C illustrates an example process 270 for determining one or more landing zones with a geological model according to the present disclosure. In some aspects, process 270 may be executed with or by the well landing zone solver 130 as part of the distributed network architecture 100. Process 270 may begin at step 271, which includes identifying or receiving a request that comprises data associated with one or more drilled wells in a reservoir basin. The data may include, for example, one or more of the following: well name, well API number (e.g., wellbore API number), reservoir basin name into which the well is drilled, or well location data (e.g., surface latitude, longitude, TVD).

Process 270 may continue at step 272, which includes determining a particular landing zone of a plurality of landing zones for each of the identified one or more drilled wells from a geological model of the reservoir basin based on the request. For example, the geological model may be generated according to, e.g., process 200 according to the present disclosure, and include correlated well data of multiple (tens, hundreds, thousands, and more) formed in the reservoir basin and their associated landing zones in the reservoir basin. Each of the landing zones is a discrete geological layer within the reservoir basin. Step 272 includes providing an input of the data associated with one or more drilled wells into the geological model, which generates an output of a particular landing zone for each of the one or more drilled wells.

Figure 2D:
FIG. 2D illustrates a graphical output from an example process according to the present disclosure.

Process 270 may continue at step 273, which includes preparing a graphic that describes the determined particular landing zone for display at a graphical user interface. For example, a graphical output (e.g., table, graph, or otherwise) may be generated that describes or shows the determined landing zone, and in some cases information about the one or more drilled wells in the request, to show to a user (client or otherwise) of the distributed network architecture 100. FIG. 2D, for example, shows a graphical output 280 that includes information on the one or more drilled wells as well as the determined landing zones of the one or more drilled wells. In this example, graphical output 280, the drilled well information includes well number, wellbore API number, reservoir basin, and dimension information. The dimension information, in this example, includes surface latitude and longitude, total depth and true vertical depth, distance to horizon, and lateral length. The graphical output 280 also includes the determined landing zone of each of the five drilled wells in this example. Process 270 may also include displaying the prepared graphic, e.g., at a server computing system or client computing system or both.

Figure 7:
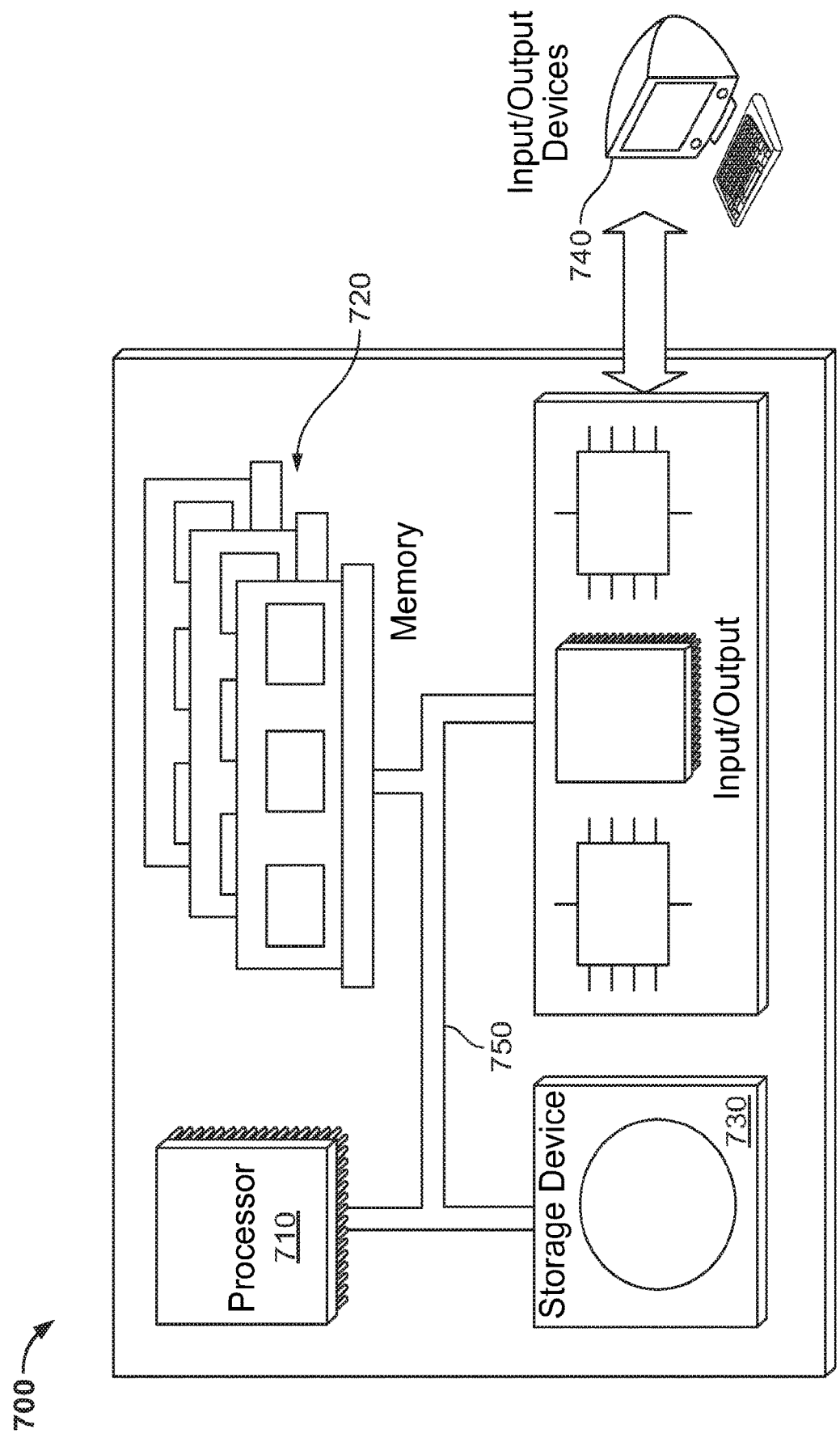
FIG. 7 is a schematic diagram of a structured data processing system that can be used for the operations described in association with any of the computer-implemented processes described herein.

FIG. 7 is a schematic illustration of an example computing system 700 for the described example operations. In some aspects, the computing system 700 may represent a server computing device or a client computing device (or both) that may be used in the operations described herein. The computing system 700 is intended to include various forms of digital computers, such as printed circuit boards (PCB), processors, digital circuitry, or other hardware. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The computing system 700 includes a processor 710, a memory 720, a storage device 730, and an input/output device 740. Each of the components 710, 720, 730, and 740 are interconnected using a system bus 750. The processor 710 is capable of processing instructions for execution within the computing system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the computing system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the computing system 700. In one implementation, the storage device 730 is a computer-readable medium. In various different implementations, the storage device 730 may be a floppy disk device, a hard disk device, an optical disk device, or a tape device.

The input/output device 740 provides input/output operations for the computing system 700. In one implementation, the input/output device 740 includes a keyboard, a pointing device, or both. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A computer-implemented method for generating a geological model, comprising:
    identifying, with one or more hardware processors, a first plurality of wells drilled into a reservoir basin from a terranean surface, with each of the first plurality of wells associated with one of a plurality of landing zones formed under the terranean surface in the reservoir basin, each of the landing zones comprising a discrete geological layer, where each of the first plurality of wells is associated with the one landing zone based on a horizontal portion of the each well being formed within the one landing zone based on a known, digital trajectory of the each well;
    identifying, with one or more hardware processors, a plurality of well data for each of a second plurality of wells drilled into the reservoir basin from the terranean surface;
    comparing, with the one or more hardware processors and a machine learning process, the plurality of well data for each well of the second plurality of wells with a reservoir basin database that associates the well data with one of the plurality of landing zones;
    correlating, with the one or more hardware processors and the machine learning process, each of the second plurality of wells with one landing zone of the plurality of landing zones based on the comparison, the machine learning process trained to derive a particular landing zone of the each of the second plurality of wells based at least in part on the plurality of well data for the each of the second plurality of wells;
    generating, with the one or more hardware processors, a geological model of the reservoir basin based on the correlated wells of the second plurality of wells and the first plurality of wells;
    identifying, at a server computing system that stores the generated geological model, a request from a client computing system that comprises an identification of one or more drilled wells in the reservoir basin;
    determining, with the server computing system and based on the generated geological model, a particular landing zone for each of the identified one or more drilled wells; and
    preparing, with the server computing system, a graphic that describes the determined particular landing zones for display at the client computing system.

2. The computer-implemented method of claim 1, wherein the plurality of well data comprises surface latitude (Y), surface longitude (X), and true vertical depth (TVD).

3. The computer-implemented method of claim 2, wherein the plurality of well data further comprise a distance-to-horizon value between the TVD and at least one of the discrete geological layers.

4. The computer-implemented method of claim 3, further comprising determining, with the one or more hardware processors, the distance-to-horizon value between each of the discrete geological layers and the TVD.

5. The computer-implemented method of claim 1, wherein the plurality of well data excludes complete directional surveys.

6. The computer-implemented method of claim 1, wherein the steps of comparing and correlating comprise executing the machine learning process.

7. The computer-implemented method of claim 6, wherein the machine learning process comprises a tree-based machine learning process.

8. The computer-implemented method of claim 1, further comprising validating, with the one or more hardware processors, the generated geological model.

9. The computer-implemented method of claim 8, wherein validating the generated geological model comprises:
    determining, with the one or more hardware processors, a number of mis-correlations of the second plurality of wells with the one landing zone of the plurality of landing zones; and
    determining, with the one or more hardware processors, that the number of mis-correlations are less than a threshold number.

10. The computer-implemented method of claim 8, wherein validating the generated geological model comprises:
    determining, with the one or more hardware processors, Shapley values for each of the second plurality of well data;
    determining, with the one or more hardware processors, a greatest of the determined Shapley values; and
    determining, with the one or more hardware processors, the particular well data that corresponds to the greatest Shapley value.

11. The computer-implemented method of claim 1, further comprising:
    identifying, at a server computing system that stores the generated geological model, a request from a client computing system that comprises an identification of the reservoir basin;
    determining, with the server computing system and based on the generated geological model, a plurality of drilled wells formed in the identified reservoir basin and a particular landing zone for each of the plurality of wells; and
    preparing, with the server computing system, a graphic that describes the determined plurality of drilled wells in the identified reservoir basin and the particular landing zone for each of the plurality of wells at the client computing system.

12. The computer-implemented method of claim 1, further comprising:
    identifying, at a server computing system that stores the generated geological model, a request from a client computing system that comprises an identification of a plurality of well data for a drilled well in the reservoir basin;
    determining, with the server computing system and based on the generated geological model, a landing zone for the drilled well; and
    preparing, with the server computing system, a graphic that describes the determined landing zone for the drilled well for display at the client computing system.

13. A computing system, comprising:
    one or more memory modules that stores or references a plurality of well data; and one or more hardware processors configured to execute instructions stored on the one or more memory modules to perform operations comprising:

identifying a first plurality of wells drilled into a reservoir basin from a terranean surface, with each of the first plurality of wells associated with one of a plurality of landing zones formed under the terranean surface in the reservoir basin, each of the landing zones comprising a discrete geological layer, where each of the first plurality of wells is associated with the one landing zone based on a horizontal portion of the each well being formed within the one landing zone based on a known, digital trajectory of the each well;

identifying a plurality of well data for each of a second plurality of wells drilled into the reservoir basin from the terranean surface;

comparing, with a machine learning process, the plurality of well data for each well of the second plurality of wells with a reservoir basin database that associates the well data with one of the plurality of landing zones;

correlating, with the machine learning process, each of the second plurality of wells with one landing zone of the plurality of landing zones based on the comparison, the machine learning process trained to derive a particular landing zone of the each of the second plurality of wells based at least in part on the plurality of well data for the each of the second plurality of wells;

generating a geological model of the reservoir basin based on the correlated wells of the second plurality of wells and the first plurality of wells;

identifying or receiving a request from a client computing system that comprises an identification of one or more drilled wells in the reservoir basin;

determining a particular landing zone for each of the identified one or more drilled wells based on the generated geological model; and preparing a graphic that describes the determined particular landing zone for display at the client computing system.

14. The computing system of claim 13, wherein the plurality of well data comprises surface latitude (Y), surface longitude (X), and true vertical depth (TVD).

15. The computing system of claim 14, wherein the plurality of well data further comprise a distance-to-horizon value between the TVD and at least one of the discrete geological layers.

16. The computing system of claim 15, wherein the operations further comprise determining the distance-to-horizon value between each of the discrete geological layers and the TVD.

17. The computing system of claim 13, wherein the plurality of well data excludes complete directional surveys.

18. The computing system of claim 13, wherein the operations of comparing and correlating comprise executing the machine learning process.

19. The computing system of claim 18, wherein the machine learning process comprises a tree-based machine learning process.

20. The computing system of claim 13, wherein the operations further comprise validating the generated geological model.

21. The computing system of claim 20, wherein validating the generated geological model comprises:

determining, with the one or more hardware processors, a number of mis-correlations of the second plurality of wells with the one landing zone of the plurality of landing zones; and determining, with the one or more hardware processors, that the number of mis-correlations are less than a threshold number.

22. The computing system of claim 20, wherein validating the generated geological model comprises:

determining, with the one or more hardware processors, Shapley values for each of the plurality of well data;

determining, with the one or more hardware processors, a greatest of the determined Shapley values; and determining, with the one or more hardware processors, the particular well data that corresponds to the greatest Shapley value.

23. The computing system of claim 13, wherein the operations further comprise:

identifying a request from a client computing system that comprises an identification of the reservoir basin;

determining a plurality of drilled wells formed in the identified reservoir basin and a particular landing zone for each of the plurality of drilled wells based on the generated geological model; and preparing a graphic that describes the determined plurality of drilled wells in the identified reservoir basin and the particular landing zone for each of the plurality of drilled wells at the client computing system.

24. The computing system of claim 13, wherein the operations further comprise:

identifying a request from a client computing system that comprises an identification of a plurality of well data for a drilled well in the reservoir basin;

determining a landing zone for the drilled well based on the generated geological model; and preparing a graphic that describes the determined landing zone for the drilled well for display at the client computing system.

25. The computer-implemented method of claim 1, wherein the known, digital trajectory of the each well comprises a complete digital trajectory of the each well.

26. The computer-implemented method of claim 25, wherein the plurality of well data for each of the second plurality of wells comprises an incomplete digital trajectory of the each of the second plurality of wells.

27. The computer-implemented method of claim 26, wherein the machine learning process is trained to derive a particular landing zone of the each of the second plurality of wells based at least in part on the incomplete digital trajectory of the each of the second plurality of wells.

28. The computing system of claim 13, wherein the known, digital trajectory of the each well comprises a complete digital trajectory of the each well.

29. The computing system of claim 28, wherein the plurality of well data for each of the second plurality of wells comprises an incomplete digital trajectory of the each of the second plurality of wells.

30. The computing system of claim 29, wherein the machine learning process is trained to derive a particular landing zone of the each of the second plurality of wells based at least in part on the incomplete digital trajectory of the each of the second plurality of wells.

* * * * *